United States Patent
Abe et al.

(10) Patent No.: US 6,524,878 B2
(45) Date of Patent: Feb. 25, 2003

(54) MICROACTUATOR, METHOD FOR MAKING THE SAME, AND MAGNETIC HEAD UNIT AND MAGNETIC RECORDING APPARATUS USING THE SAME

(75) Inventors: Munemitsu Abe, Miyagi-ken (JP); Masayoshi Esashi, Miyagi-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 0 days.

(21) Appl. No.: 10/133,121

(22) Filed: Apr. 25, 2002

(65) Prior Publication Data
US 2002/0121839 A1 Sep. 5, 2002

Related U.S. Application Data (62) Division of application No. 09/484,792, filed on Jan. 18, 2000, now abandoned.

(30) Foreign Application Priority Data

Jan. 21, 1999 (JP) ............................................ 11-013607
Sep. 6, 1999 (JP) ............................................ 11-252310

(51) Int. Cl.$^7$ ....................... H01L 21/00; H01L 21/301; H02N 1/00
(52) U.S. Cl. .......................... 438/52; 438/456; 310/309
(58) Field of Search .................. 438/3, 21, 50, 438/51, 52, 53, 456; 310/309

(56) References Cited

U.S. PATENT DOCUMENTS

| | | | |
|---|---|---|---|
| 6,181,531 B1 * | 1/2002 | Koshikawa et al. | 360/294.4 |
| 6,190,571 B1 * | 2/2002 | Kato | 216/2 |
| 6,208,013 B1 * | 3/2002 | Suzuki | 257/623 |
| 6,265,806 B1 * | 7/2002 | Suzuki | 310/309 |
| 6,424,504 B1 * | 7/2002 | Abe et al. | 360/294.4 |

* cited by examiner

Primary Examiner—John F. Niebling
Assistant Examiner—Viktor Simkovic
(74) Attorney, Agent, or Firm—Brinks Hofer Gilson & Lione

(57) ABSTRACT

A microactuator has a first substrate, a second substrate, a first comb electrode having a plurality of first comb elements formed on an inner surface of the first substrate, a second comb electrode having a plurality of second comb elements formed on an inner surface of the second substrate, and a connecting film formed by partially removing an interlayer formed on the inner face of any one of the first substrate and the second substrate. The first substrate and the second substrate face each other with a distance and are movable with respect to each other. The first comb elements and the second comb elements are alternately disposed. Any one of the first electrode and the second electrode is bonded to the connecting film. This microactuator is preferably used in magnetic head units and magnetic recording apparatuses.

4 Claims, 7 Drawing Sheets

MICROACTUATOR, METHOD FOR MAKING THE SAME, AND MAGNETIC HEAD UNIT AND MAGNETIC RECORDING APPARATUS USING THE SAME

This application is a division of application Ser. No. 09/484,792, filed Jan. 18, 2000 now abandoned, which is hereby incorporated by reference herein.

BACKGROUND OF THE INVENTION

1. Field of the Invention

The present invention relates to microactuators, methods for making the same, and magnetic head units and magnetic recording apparatuses using the same. In particular, the present invention relates to a method for making a microactuator which is assembled in magnetic head units and is suitable for precise alignment of the position of the magnetic head.

2. Description of the Related Art

A magnetic recording apparatus generally has a magnetic recording medium having a data-recording surface, such as a magnetic disk, a magnetic head for writing information into and reading the information from the magnetic recording medium, a head holder including a slider and a gimbal for supporting the magnetic head, and a head driver such as a voice coil motor for driving the head holder in order to align the position of the magnetic head with respect to a required track on the magnetic recording medium. In the alignment of the position of the magnetic head by the voice coil motor, current voice coil motors reach the limits of the alignment precision in consideration of a trend towards a finer track width. Thus, a proposed method is a combination of coarse adjustment of the head position using the voice coil motor and then fine alignment using a high-precision actuator.

Figure 7:
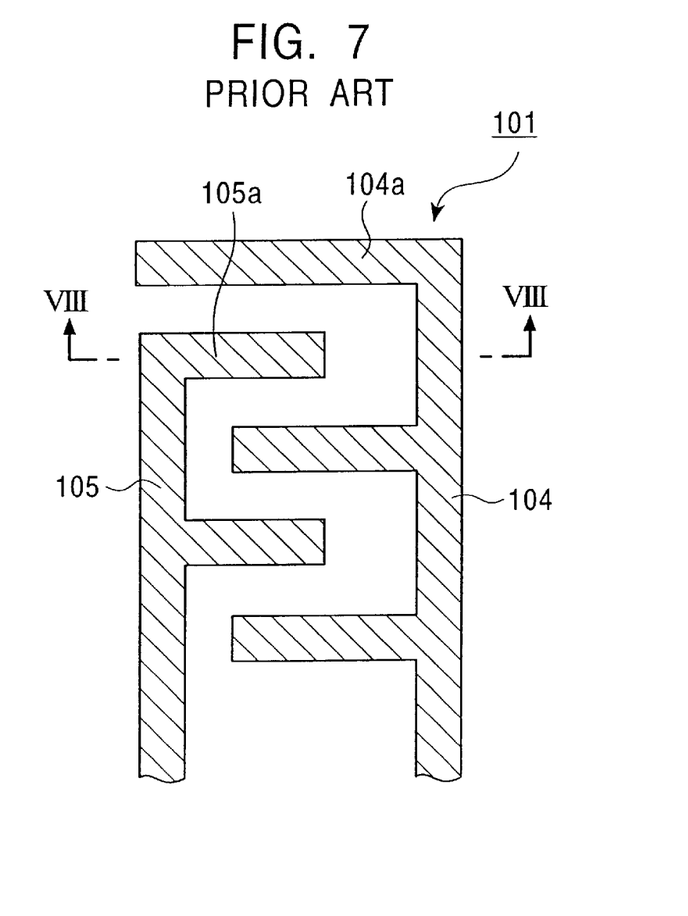
FIG. 7 is a partially cut-out plan view of a conventional electrostatic microactuator.
Figure 8:
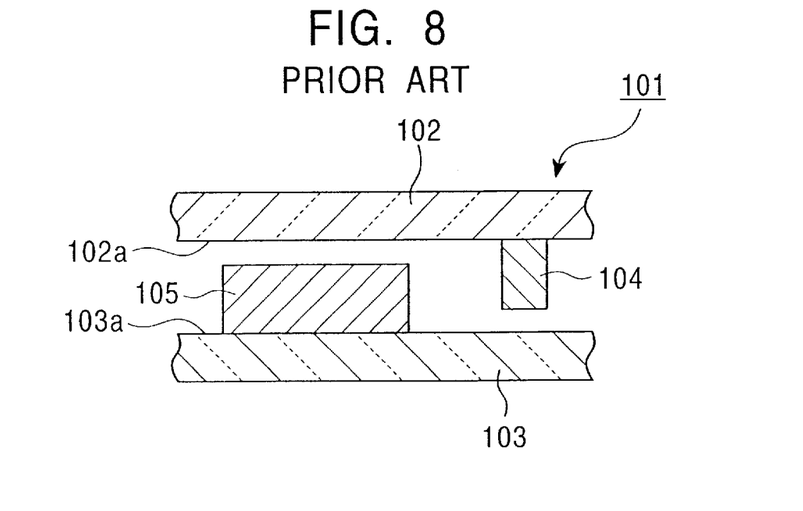
FIG. 8 is a cross-sectional view taken from line VIII—VIII in FIG. 7.

FIGS. 7 and 8 show an example of a conventional actuator having high precision and capable of being finely movable. The actuator 101 shown in FIGS. 7 and 8 is generally called an electrostatic actuator which is driven by an electrostatic attractive force. The electrostatic actuator 101 includes two glass substrates, i.e., a first substrate 102 and a second substrate 103, facing each other with a given distance and movable with respect to each other in the horizontal direction. The first substrate 102 has a first comb electrode 104 having a plurality of comb elements 104a which are parallel to each other on an inner face 102a thereof, whereas, the second substrate 103 has a second comb electrode 105 having a plurality of comb elements 105a which are parallel to each other on an inner face 103a thereof. The comb elements 104a and the comb elements 105a are alternately arranged.

When a voltage is applied between the first electrode 104 and the second electrode 105 in the above electrostatic actuator 101, the comb elements 104a of the first electrode 104 and the comb elements 105a of the second electrode 105 are deeply engaged with each other by the electrostatic attractive force generated between the first electrode 104 and the second electrode 105. Thus, the first electrode 104 approaches the second electrode 105 so that the first substrate 102 and the second substrate 103 move with respect to each other. When the voltage is cut, the engagement is released due to the removal of the electrostatic attractive force. Thus, the first electrode 104 withdraws from the second electrode 105 so that the first substrate 102 and the second substrate 103 move with respect to each other in the reverse direction.

Figure 9A:
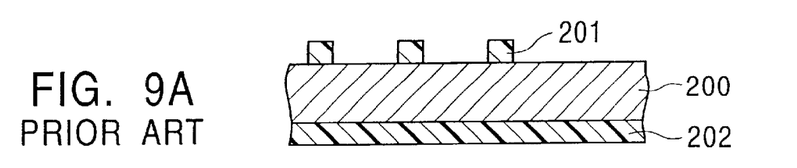
FIGS. 9A to 9H are cross-sectional views of steps in a method for making the microactuator shown in FIG. 7.
Figure 9B:
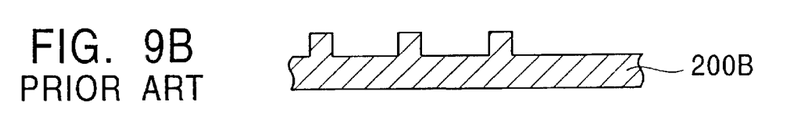
Figure 9C:
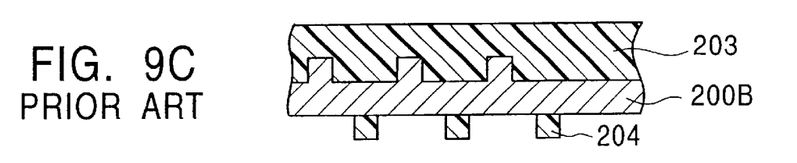
Figure 9D:
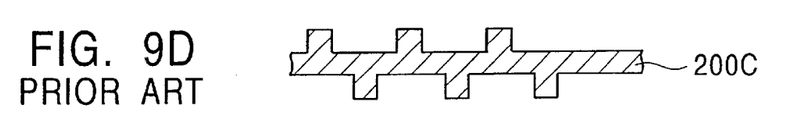

A conventional manufacturing process of the above electrostatic actuator 101 will be described with reference to FIGS. 9A to 9H. Referring to FIG. 9A, a resist film 201 having a predetermined pattern is formed on the upper surface and a resist film 202 is formed on the entire lower surface of a conductive silicon wafer 200. The conductive silicon wafer 200 is etched through the resist film 201 as a first mask, and then the resist films 201 and 202 are removed. A silicon wafer 200B having an outer shape shown in FIG. 9B is prepared. A resist film 203 is formed on the entire upper surface of the silicon wafer 200B and a resist film 204 having a predetermined pattern is formed on the lower surface of the silicon wafer 200B, as shown in FIG. 9C. The silicon wafer 200B is etched through the resist film 204 as a second mask, and then the resist films 203 and 204 are removed. A silicon wafer 200C having predetermined patterns on the two surfaces thereof is thereby prepared, as shown in FIG. 9D.

Figure 9E:
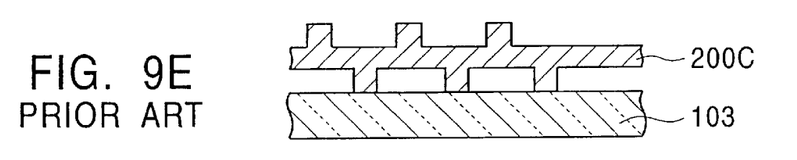
Figure 9F:
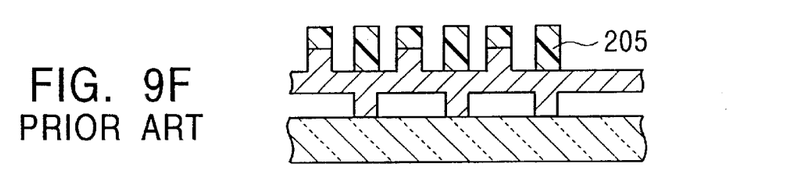
Figure 9G:
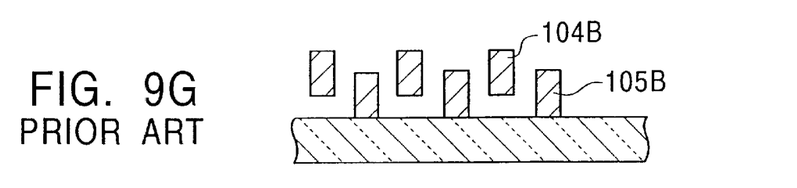

With reference to FIG. 9E, the silicon wafer 200C is bonded to a second glass substrate 103 provided with a predetermined wiring pattern (not shown in the drawing) of a metal such as aluminium, which is preliminarily formed using a third mask (not shown in the drawing), by an anodic bonding process to form a semi-finished product. A resist film 205 having a predetermined pattern is formed on the upper face of the silicon wafer 200C, as shown in FIG. 9F, and the silicon wafer 200C is etched through the resist film 205 as a fourth mask until the silicon wafer 200C is completely removed at unmasked regions. The resist mask 205 is removed to form electrode precursors 105B for the second electrodes on the second substrate 103 and electrode precursors 104B for the first electrodes, as shown in FIG. 9G, in which the electrode precursors 105B are connected to the electrode precursors 104B in the boundary regions (not shown in the drawing).

Figure 9H:
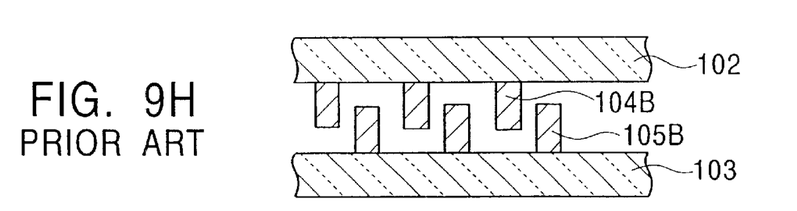

With reference to FIG. 9H, the electrode precursors 104B are bonded to a first glass substrate 102 having a predetermined wiring pattern of a metal such as aluminium, which is preliminarily formed using a fifth mask (not shown in the drawing), by an anodic bonding process to form the microactuator shown in FIGS. 7 and 8.

As described above, this manufacturing process needs five masks. A reduction in the number of masks and steps in this process would produce actuators with further reduced manufacturing costs.

SUMMARY OF THE INVENTION

Accordingly, it is an object of the present invention to provide a microactuator capable of reducing the number of masks in the production process and simplifying the production process, and a method for making the microactuator.

It is another object of the present invention to provide a magnetic head unit and a magnetic recording apparatus using the microactuator.

A microactuator in accordance with the present invention comprises a first substrate, a second substrate, the first substrate and the second substrate facing each other with a distance and movable with respect to each other, a first comb electrode having a plurality of first comb elements formed on an inner surface of the first substrate, a second comb electrode having a plurality of second comb elements formed on an inner surface of the second substrate, the first comb elements and the second comb elements being alternately disposed, and a connecting film formed by partially removing an interlayer formed on the inner face of any one of the first substrate and the second substrate, any one of the first electrode and the second electrode being bonded to the connecting film.

A method for making a microactuator in accordance with the present invention comprises providing a first substrate and a second substrate facing each other with a distance and movable with respect to each other, and providing a first comb electrode having a plurality of first comb elements formed on an inner surface of the first substrate and a second comb electrode having a plurality of second comb elements formed on an inner surface of the second substrate, wherein a wafer comprising two substrate layers and an interlayer provided therebetween is used as any one of the first substrate and the second substrate and one of the two substrate layers is etched using a mask having a predetermined pattern to form a first electrode precursor group and a second electrode precursor group for the first electrodes and the second electrodes, respectively, the interlayer below any one of the first and second electrode precursor groups is removed by etching to form any unconnected one of the first and second electrodes and to form the other one of the first and second electrodes supported by connecting films formed by etching of the remaining interlayer, and said unconnected one is bonded to the other one of the first substrate and the second substrate.

In the microactuator and the method for making the same in accordance with the present invention, either the first electrode or the second electrode is bonded to one of the first and second substrates via the connecting film. Thus, only the unbonded electrode is bonded to the other substrate not provided with the connecting film. That is, the bonding between the electrode and the substrate, which precludes precise alignment, can be achieved by only one bonding step. In contrast, the above conventional process requires two bonding steps. As a result, the method in accordance with the present invention facilitates precise alignment, improves the yield, and simplifies the production process.

The interlayer may be etched by a wet etching process using an etchant or a dry etching process using plasma etc. When one of the two substrate layers is etched through a mask having a given pattern to form the electrode precursors for the first and second electrodes, the dry etching process capable of vertically etching side walls is preferred.

The other substrate may comprise any insulating materials. In particular, glass which facilitates bonding is preferred.

In the microactuator in accordance with the present invention, the first electrode or the second electrode is bonded to the connecting film formed by partial etching of the interlayer. Thus, the gap formed between the electrode not bonded to the connecting film and the other substrate material can be uniformly and securely controlled to a predetermined value. When the gap is a fine gap on the order of less than 10 $\mu$m, for example, several micrometers, the first electrode or the second electrode is not bonded to the other substrate in unrequited portions. As a result, the microactuator can be miniaturized.

In the microactuator, the first and second electrodes may comprise silicon and the interlayer may comprise a material which is selectively etched with respect to the silicon.

In the method for making the microactuator, one of the two substrate material layers may comprise silicon and the interlayer may comprise a material which is selectively etched with respect to the silicon.

Such a microactuator can be readily produced by using a wafer comprising two substrate layers and an interlayer disposed therebetween, by etching one of the two substrate layers to form the first and second electrodes, by etching the interlayer using the first and second electrodes as masks to form the first and second electrodes which are supported by the connecting film composed of the remaining interlayer and the other substrate layer.

The microactuator can be produced using only two masks, that is, a mask for forming a predetermined pattern onto one substrate layer of the wafer and another mask for forming electrodes supported by the connecting film.

In this microactuator, the first electrode, the second electrode, and the substrate provided with the connecting film may comprise silicon, and the interlayer may comprise at least one of the silicon oxide film and the silicon-boron-oxygen insulating film.

In the method for making the microactuator, both the substrate layers may comprise silicon and the interlayer may comprise at least one of the silicon oxide film and the silicon-boron-oxygen insulating film.

High bonding strength is secured between silicon and the silicon oxide film and between the silicon and the silicon-boron-oxygen insulating film. Thus, in the microactuator, high bonding strength is secured between the substrate and the connecting film formed by etching of the interlayer and between the connecting film and the first and second electrodes.

In the above microactuator, the first and second electrodes are readily formed by using a wafer comprising two silicon substrate layers and an interlayer and by etching the silicon substrate layers.

Since the electrode not bonded to the connecting film comprises silicon, this electrode can readily be bonded to a glass substrate by an anodic bonding process.

In the microactuator of the present invention, the first and second electrodes may comprise silicon, the substrate provided with the connecting film may comprise glass or ceramic, and the interlayer may comprise a polyimide.

In the method for making the microactuator, one of the substrate layers may comprise silicon, the other substrate may comprise glass or ceramic, and the interlayer may comprise a polyimide.

The polyimide interlayer is formed by coating a polyimide solution onto a glass or ceramic substrate by a spin coating process. Next, a silicon substrate is bonded to the intermediate layer by pressure to form a wafer having a triple-layer structure.

A resist is applied onto the wafer, the silicon substrate is etched by a photolithographic process to form the first and second electrodes, the polyimide interlayer is etched through the first and second electrodes as masks by an oxygen plasma process to form the first and second electrodes supported by the connecting film of the interlayer provided on the glass or ceramic substrate layer, and then the electrode not supported by the connecting film of the first and second electrodes is bonded to the other substrate opposing to the glass or ceramic substrate provided with the connecting film.

The magnetic head unit in accordance with the present invention has the above microactuator. In this magnetic head unit, positioning or tracking of the magnetic head at a required track on a magnetic disk is performed by the operation of a voice coil motor and precise alignment of the magnetic head is performed by the operation of an electrostatic actuator mounted at the tip of a gimbal. The accuracy of the tracking in the hard disk is thereby further improved and the magnetic head unit is highly reliable.

DESCRIPTION OF THE PREFERRED EMBODIMENTS

Figure 1:
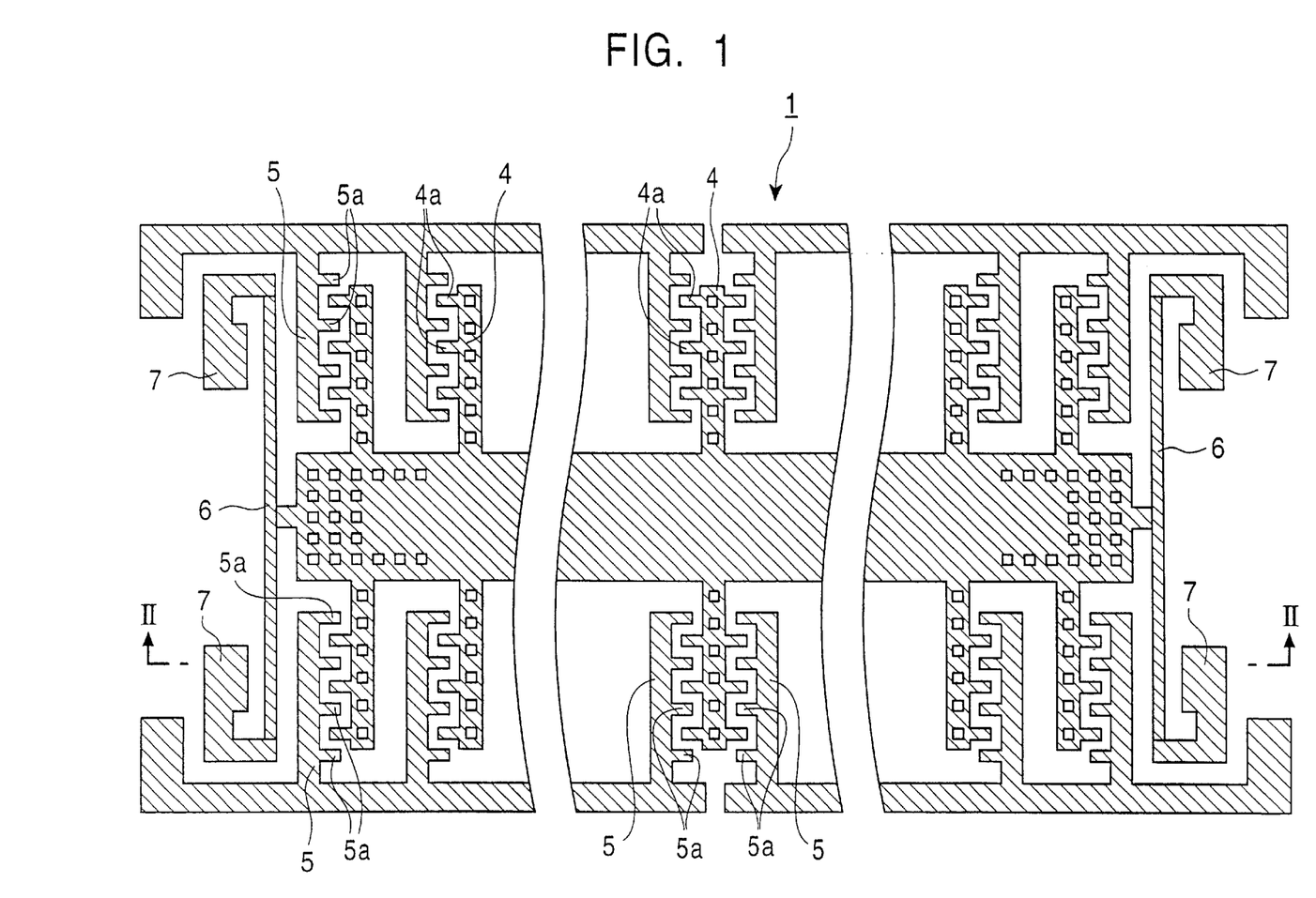
FIG. 1 is a partially cut-out plan view of an embodiment of a microactuator produced by a method in accordance with the present invention.
Figure 2:
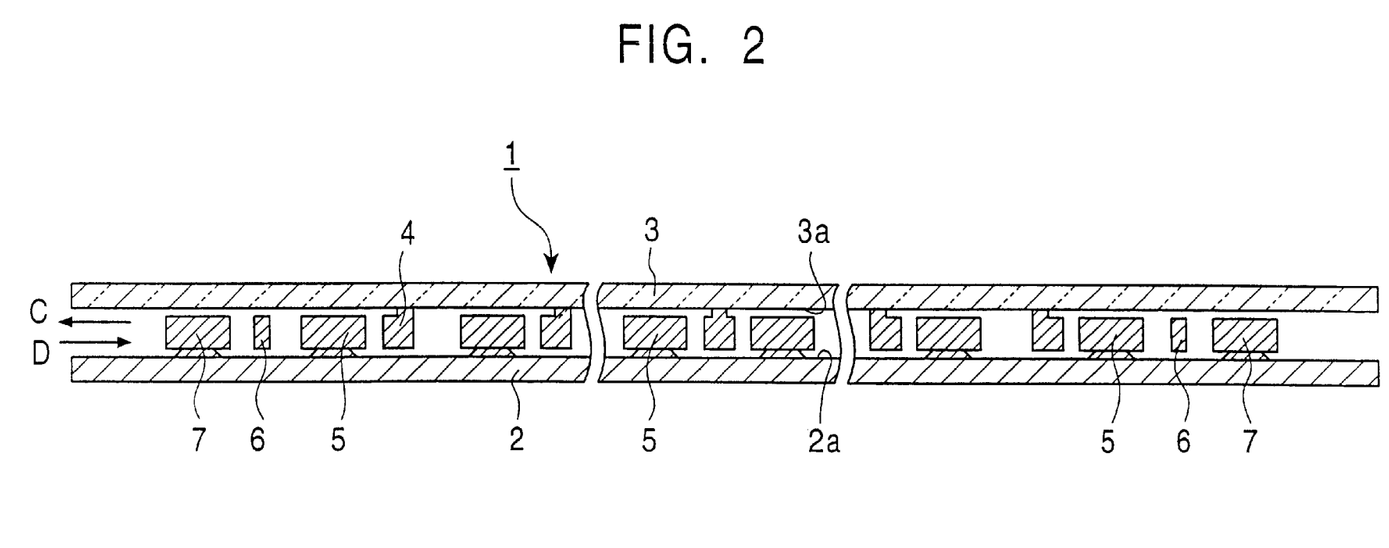
FIG. 2 is an enlarged cross-sectional view taken from line II—II in FIG. 1.

With reference to FIGS. 1 to 4, an embodiment of the method for making a microactuator in accordance with the present invention will now be described. FIG. 1 is a top view of the microactuator produced in this embodiment, and FIG. 2 is a cross-sectional view taken from line II—II in FIG. 1. A microactuator 1 in accordance with the present invention has a first substrate 3 provided with first electrodes 4, and a second substrate 2. The first substrate 3 and the second substrate 2 moves with respect to each other in the directions of arrows C and D. When the microactuator 1 is assembled into a magnetic head unit, the second substrate 2 is fixed so that only the first substrate 3 can move. Thus, the first substrate 3 is a movable substrate whereas the second substrate 2 is a fixed substrate. Similarly, the first electrodes 4 are movable electrodes whereas second electrodes 5 are fixed electrodes. The size of the microactuator generally has a length of 1 to 2 mm, a width of 1 to 2 mm, and a height of 0.6 to 0.8 mm.

With reference to FIGS. 1 and 2, the second substrate 2 and the first substrate 3 face each other with a given distance, the first electrodes 4 are provided on an inner face 3a of the first substrate 3, whereas the second electrodes 5 are provided on an inner face 2a of the second substrate 2. When a voltage is applied,between the movable electrodes 4 and the fixed electrodes 5, the movable electrodes 4 approach the fixed electrodes 5 and the first substrate 3 moves.

The second substrate 2 is formed of a semiconductor wafer comprising two silicon layers and a silicon oxide film and/or a silicon-boron-oxygen insulating film provided therebetween. The first electrode 4 and the second electrode 5 are formed of a conductive silicon material. The first substrate 3 is formed of a pyrex glass.

The first electrode 4 has a comb shape having a plurality of comb elements 4a which are arranged parallel to each other. The second electrode 5 also has a comb shape having a plurality of comb elements 5a which are arranged parallel to each other. The comb elements 4a and the comb elements 5a are alternately arranged. In other words, one of the comb elements 5a is disposed between two adjacent comb elements 4a. The comb elements 4a of the first electrode 4 are arranged in the right and left sides and two second electrodes 5 are disposed so as to surround the right and left comb elements 4a. The second electrode 5 lying at the right side of the first electrode 4 is provided to move the first substrate 1 in the right direction when a voltage is applied, whereas the second electrode 5 lying at the left side of the first electrode 4 is provided to move the first substrate 1 in the left direction when a voltage is applied.

In relative movement of the first substrate 2 and the second substrate 3, when a voltage is applied between the first electrode 4 and the second electrode 5, the first substrate 3 moves in the longitudinal direction of the comb elements so that the comb elements 4a and the comb elements 5a are further engaged with each other. Among side faces of the comb elements 4a and 5a, the length of each side face parallel to the moving direction of the substrate determines the displacement of the substrate when the voltage is applied.

As shown in FIG. 1, one first electrode 4 and two second electrodes 5 form an electrode combination. One electrostatic actuator has a plurality of electrode combinations arranged in the moving direction of the substrate. The silicon constituting the second electrodes 5, having comb elements 5a, is formed on the second substrate 2. The silicon constituting the first electrodes 4, having comb elements 4a, extends to spring holders 6. Each spring holder 6 is fixed by an anchor 7. The first electrodes 4, the spring holders 6 and the anchors 7 are integrally formed of silicon. A silicon stopper (not shown in the drawing) is formed between each spring holder 6 and each anchor 7.

An isopotential pattern (not shown in the drawing) composed of a metal such as aluminium is provided on the inner surface 3a of the first substrate 3 which lies above the silicon region between the substrates other than silicon fixed to the side of the first substrate 3, such as the regions above the second electrodes 5, the spring holders 6, and the anchors 7. The isopotential pattern makes the substrate surface and the silicon the same potential in order to avoid bonding of the silicon regions, which must not be bonded to the first substrate 3, with the first substrate 3 during an anodic bonding process of the silicon and the first substrate 3.

With reference now to FIGS. 3A to 3F, and 4A and 4B, the manufacturing process in accordance with the present invention is described. A semiconductor wafer 8 is provided. The semiconductor wafer 8 comprises upper and lower silicon layers 9 and 12, respectively, and an interlayer 30 provided therebetween. The interlayer 30 comprises a silicon oxide layer 10 and a silicon-boron-oxide insulating layer 11. The thicknesses of these layers can be independently determined. For example, the thicknesses are 120 μm for the upper silicon layer 9, 1 μm for the silicon oxide layer 10, 9 μm for the silicon-boron-oxygen insulating layer 11, and 350 μm for the lower silicon layer 12.

Figure 3A:
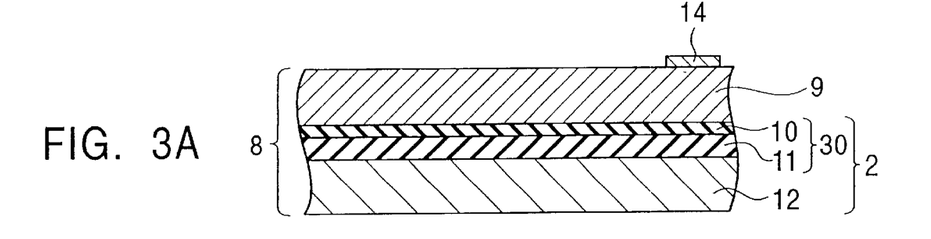
FIGS. 3A to 3F are cross-sectional views of steps in the method in FIG. 1.

The semiconductor wafer 8 is subjected to preliminary treatment such as cleaning and is oxidized. Next, a photoresist is applied on an oxide film formed on the upper silicon layer 9 by oxidation to form a required pattern. The oxide film is patterned through a photoresist mask (not shown in the drawing) as shown in FIGS. 3A and 4A so that the oxide film remains in the regions such as the first electrodes 4 which will be bonded to the first substrate 3. The remaining oxide film will be used as a mask 14 in the etching step in FIG. 3D. The photoresist mask is removed using a photoresist stripper.

Figure 3B:
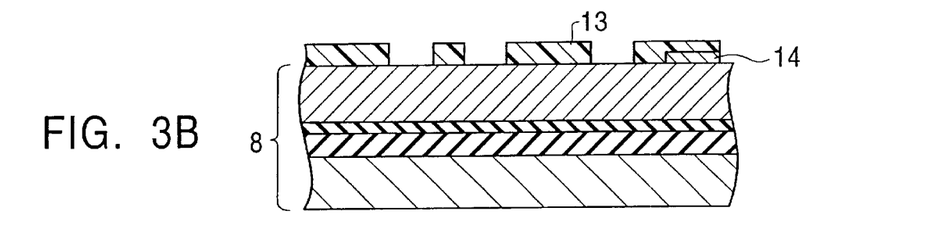
Figure 3C:
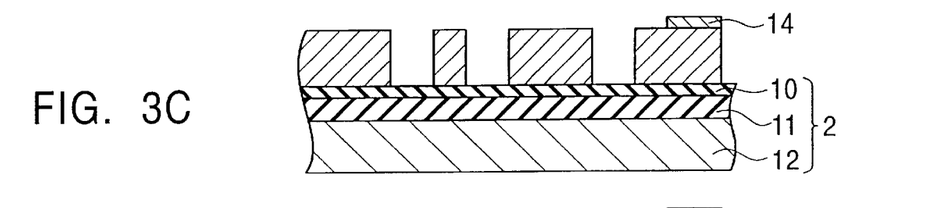
Figure 4A:
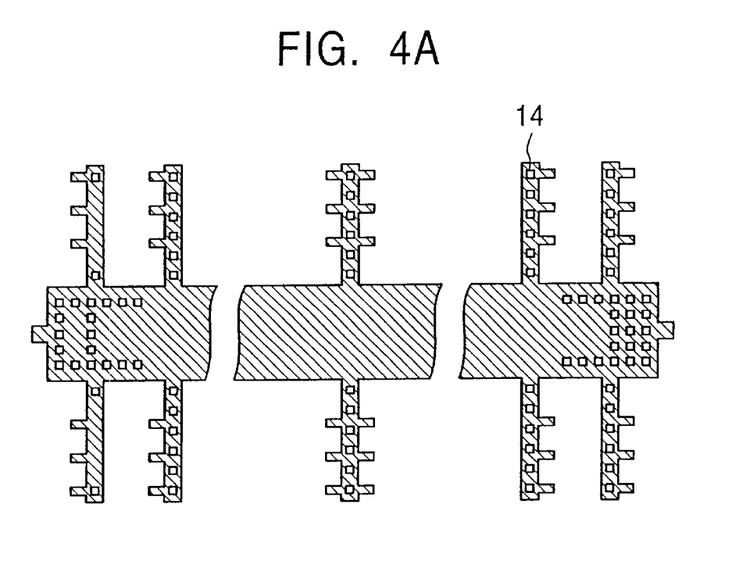
FIG. 4A is a plan view of a mask pattern for forming silicon regions bonded to a movable substrate and FIG. 4B is a plan view of a mask pattern for forming movable electrodes and fixed electrodes.
Figure 4B:
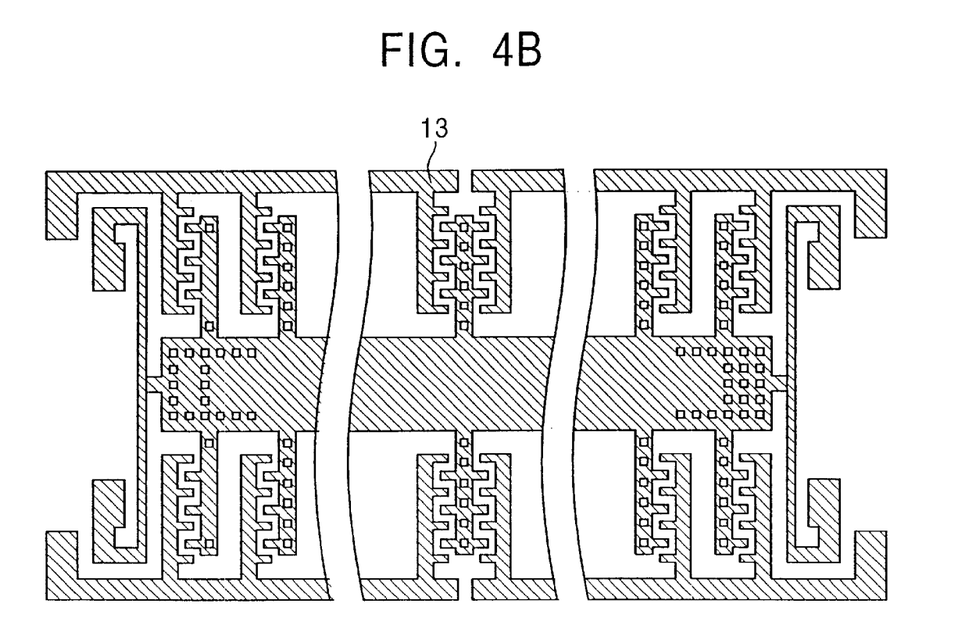

With reference to FIG. 3B, a photoresist is applied on the semiconductor wafer 8 having the oxide film pattern and is patterned to form a mask 13 for forming the first electrodes 4 and the second electrodes 5, as shown in FIG. 4B. Using the mask 13, the upper silicon layer 9 of the semiconductor wafer 8 is etched away to form silicon islands by an etching process such as a dry etching process, as shown in FIG. 3C. The mask 13 is removed using a resist stripper.

Figure 3D:
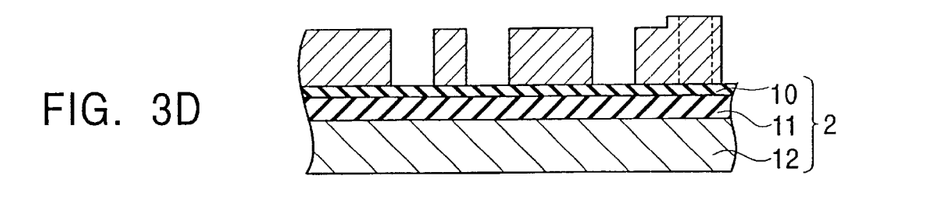
Figure 3E:
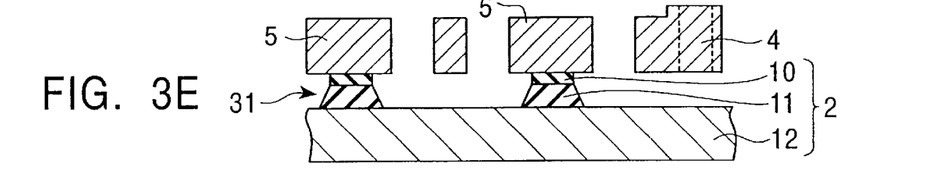

With reference to FIG. 3D, the top surfaces of the silicon islands are etched through the mask 14 to a predetermined depth by, for example, a dry etching process. With reference to FIG. 3E, required regions, which are separated from the silicon layer 12, of the silicon-boron-oxide insulating film 11 and the silicon oxide film 10 are removed by a side etching process using an etchant containing a predetermined concentration of HF. The remaining portions of the layers 11 and 10 are referred to connecting films 31. For the successful formation of the silicon islands separated by the side etching and of the silicon islands not separated by the side etching, the width of the unseparated islands is set to be larger than the width of the separated islands. For example, the width of the unseparated islands is 30 $\mu$m and the width of the separated islands is 10 $\mu$m.

In the grid-like structure shown in FIG. 1, a wide structural unit having a large width is an assembly comprising narrow structural units having small widths. Thus, the wide structural unit can also be separated from the silicon layer 9, the silicon oxide layer 10 and the silicon-boron-oxygen insulating layer 11.

Figure 3F:
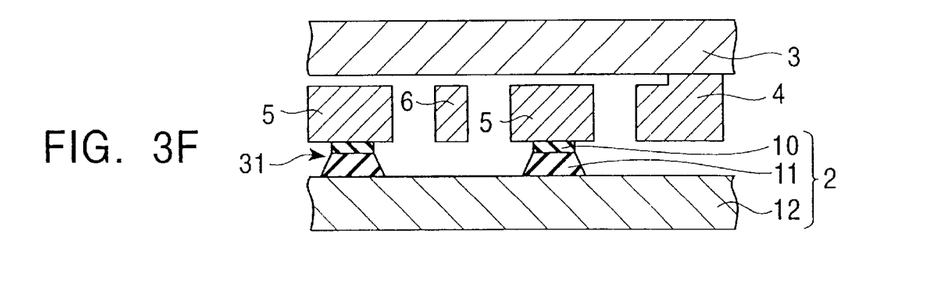

With reference to FIG. 3F, the second substrate 2 and the first substrate 3 composed of glass are bonded to each other by an anodic bonding process to complete a microactuator.

Figure 5:
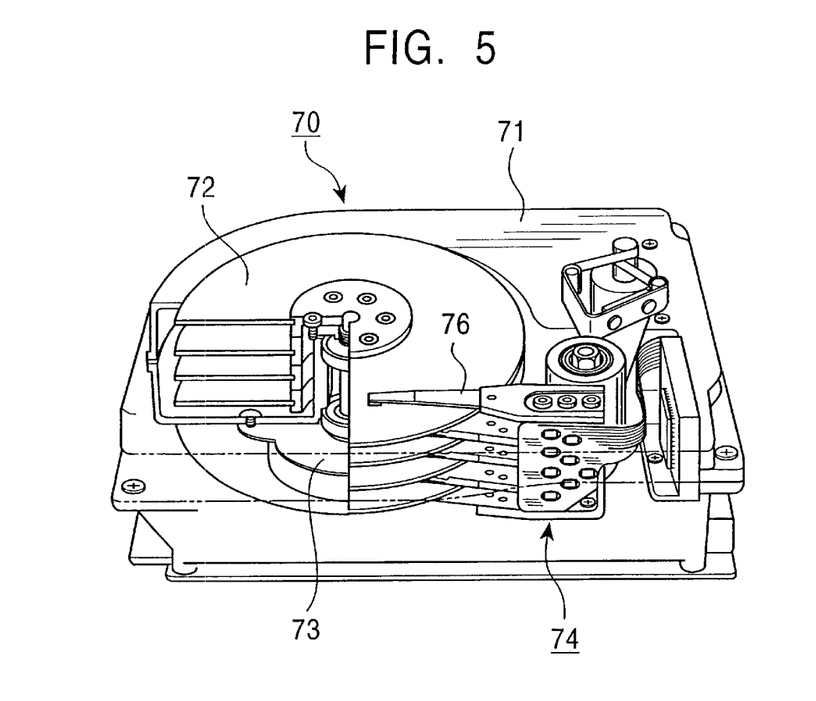
FIG. 5 is a perspective view of a hard disk drive using the microactuator shown in FIG. 1.

An embodiment of a magnetic recording apparatus using the above microactuator is described below. FIG. 5 shows an embodiment of a hard disk drive as an example of the magnetic recording apparatus. A hard disk drive 70 includes a plurality of magnetic disks 72 as magnetic recording media in a case 71. Each disk 72 has a magnetic surface layer comprising several hundreds to several thousands of recording tracks having a width of approximately 2 $\mu$m for recording data. These disks 72 are rotated by a driving motor 73.

Figure 6:
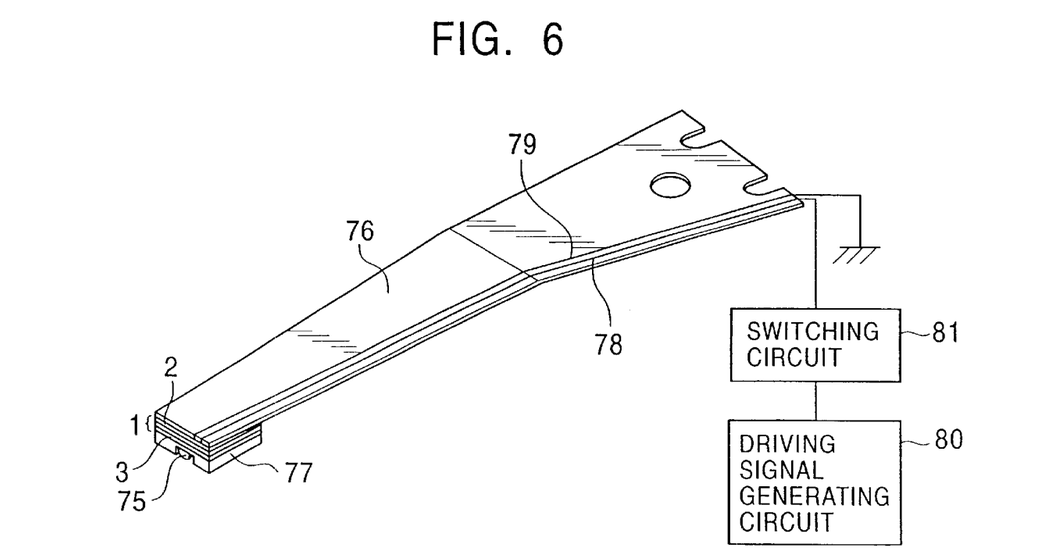
FIG. 6 is a perspective view of a magnetic head unit in the hard disk drive shown in FIG. 5.

A magnetic head unit 74 is disposed in the vicinity of the disk 72 in the case 71. The magnetic head unit 74 has a plurality of magnetic heads corresponding to the number of the disks 72. With reference to FIG. 6, each magnetic head 75 is fixed at the tip of a gimbal 76 made of a flexible thin metal film and is driven by a voice coil motor onto the disk 72 in the radial direction. The magnetic head 75 is a contact start stop (CSS) type, that is, the magnetic head 75 comes into contact with the surface of the disk 72 when the disk 72 does not rotate and floats a given distance above the disk 72 when the disk 72 rotates. Thus, the magnetic head 75 is fixed to a slider 77 at the tip of the gimbal 76. The magnetic head 75 floats by means of an air stream generated by the slider 77 when the disk 72 rotates.

In this embodiment, the microactuator 1 is provided between the gimbal 76 and the slider 77. The fixed substrate 2 of the microactuator 1 is fixed to the gimbal 76 and the movable substrate 3 is fixed to the slider 77. The microactuator 1 is arranged so that the movable substrate 3 moves in the width direction of the gimbal 76. The gimbal 76 has data transmission lines (not shown in the drawing) for the magnetic head 75, lines 78 for applying a voltage to the fixed electrodes of each actuator element (only one line is shown in the drawing for simplicity), and a line 79 connected to a common electrode for the movable electrodes.

The magnetic head unit 74 has a switching circuit 81 for supplying signals or voltages, which are generated in a driving signal generating circuit 80 for driving the microactuator 1, to the lines 78.

In this hard disk drive 70, positioning or tracking of the magnetic head 75 on a required track on the magnetic disk 72 is achieved by means of the operation of the voice coil motor, and precise alignment is achieved by the operation of the microactuator mounted at the tip of the gimbal 76.

The scope of the present invention is not limited to the above embodiments. For example, any other types of wafers may be used in the production of the microactuator. For example, a usable wafer may be composed of three layers including a silicon substrate layer and a glass or ceramic substrate layer and a polyimide interlayer provided therebetween. This triple-layer wafer can be formed, for example, as follows. The polyimide interlayer is formed on the glass or ceramic substrate layer by a spin coating process and the silicon substrate is bonded to the polyimide interlayer by pressure.

A resist is applied onto the wafer, and the silicon substrate is etched by a photolithographic process to form first and second electrodes. The polyimide interlayer is etched through the first and second electrodes as masks by oxygen plasma. Thus, either the first electrode or second electrode is supported by a connecting film formed of the interlayer on the glass or ceramic substrate. Among the first and second electrodes, the electrode not supported by the connecting film is bonded to the silicon opposing substrate to form a microactuator.

A preferable wafer is a Sodic (silicon on insulator) substrate made by Japan Ceramics Co., Ltd. This wafer has triple-layer structures of two silicon substrates each provided with a $SiO_2$ surface layer and a Si—B—O glass layer (flame hydrolysis deposited glass layer) formed therebetween. Since the Si—B—O glass layer is formed by a soot deposition process (flame hydrolysis deposition process) and has a thickness of 10 to 100 $\mu$m, it is suitable for use in the present invention.

What is claimed is:

1. A method for making a microactuator comprising providing a first substrate and a second substrate facing each other with a distance and movable with respect to each other, and providing a first comb electrode having a plurality of first comb elements formed on an inner surface of the first substrate and a second comb electrode having a plurality of second comb elements formed on an inner surface of the second substrate;

wherein a wafer comprising two substrate layers and an interlayer provided therebetween is used as any one of the first substrate and the second substrate and one of the two substrate layers is etched using a mask having a predetermined pattern to form a first electrode precursor group and a second electrode precursor group for the first electrodes and the second electrodes, respectively, the interlayer below any one of the first and second electrode precursor groups is removed by etching to form any unconnected one of the first and second electrodes and to form the other one of the first and second electrodes supported by connecting films formed by etching of the remaining interlayer, and said unconnected one is bonded to the other one of the first substrate and the second substrate.

2. A method for making a microactuator according to claim 1, wherein one of the two substrate layers comprises silicon and the interlayer comprises a material which is selectively etched with respect to the silicon.

3. A method for making a microactuator according to claim 1, wherein both the substrate layers comprise silicon and the interlayer comprises at least one of a silicon oxide film and a silicon-boron-oxygen insulating film.

4. A method for making a microactuator according to claim 1, wherein one of the two substrate layers comprises silicon, the other of the two substrate layers comprises one of glass and ceramic, and the interlayer comprises a polyimide.

* * * * *